United States Patent [19]

Sistare

[11] Patent Number: 4,827,616

[45] Date of Patent: May 9, 1989

[54] IN-LINE HEDGE TRIMMER WITH PLANETARY GEAR DRIVE AND VIBRATION DAMPING BLADE ASSEMBLY

[75] Inventor: James R. Sistare, Pickens, S.C.

[73] Assignee: Ryobi Motor Products Corp., Pickens, S.C.

[21] Appl. No.: 164,765

[22] Filed: Mar. 7, 1988

[51] Int. Cl.$^4$ ............................................. B26B 15/00
[52] U.S. Cl. .................................. 30/210; 30/272 R; 30/392
[58] Field of Search ................ 30/210, 216, 220, 241, 30/272 R, 392, 393, 394; 56/233, 236, 237; 74/750 R; 173/162.1, 162.2

[56] References Cited

U.S. PATENT DOCUMENTS

| Re. 3,394 | 4/1869 | Hendryx . | |
|---|---|---|---|
| 51,746 | 12/1865 | Palmer . | |
| 1,512,781 | 10/1924 | Masland . | |
| 1,594,244 | 7/1926 | Daniels . | |
| 1,763,500 | 6/1930 | Bowen | 30/392 |
| 2,506,736 | 5/1950 | Oschwald | 30/392 X |
| 2,557,429 | 6/1951 | Hawley | 30/392 X |
| 2,633,636 | 7/1953 | Szostek | 30/216 |
| 3,116,651 | 1/1964 | Hardy | 74/750 R X |
| 3,430,521 | 3/1969 | Kulman | 74/750 R |
| 4,010,544 | 3/1977 | Siman | 173/162.1 X |

Primary Examiner—Frank T. Yost
Assistant Examiner—Michael D. Folkerts
Attorney, Agent, or Firm—David L. Davis

[57] ABSTRACT

A power driven reciprocating blade hedge trimmer includes a speed-reducing gear train with a sun gear, a plurality of planet gears, and a surrounding hollow drum-like orbiting gear element that seals in gear train lubricant and is formed to have an outer peripheral sinuous groove serving as a cam. A pin-engaging, guided, reciprocating cutting blade element of the hedge trimmer is driven by engagement of the pin and the groove shaped cam to produce reciprocating cutting motion aligned with the axis of the rotating power source. Resilient damping elements are affixed to an end of a blade supporting element where it is held by the hand-held portion of the device, to attenuate and isolate undesirable vibrational feedback generated during reciprocation of the cutting blade element.

15 Claims, 4 Drawing Sheets

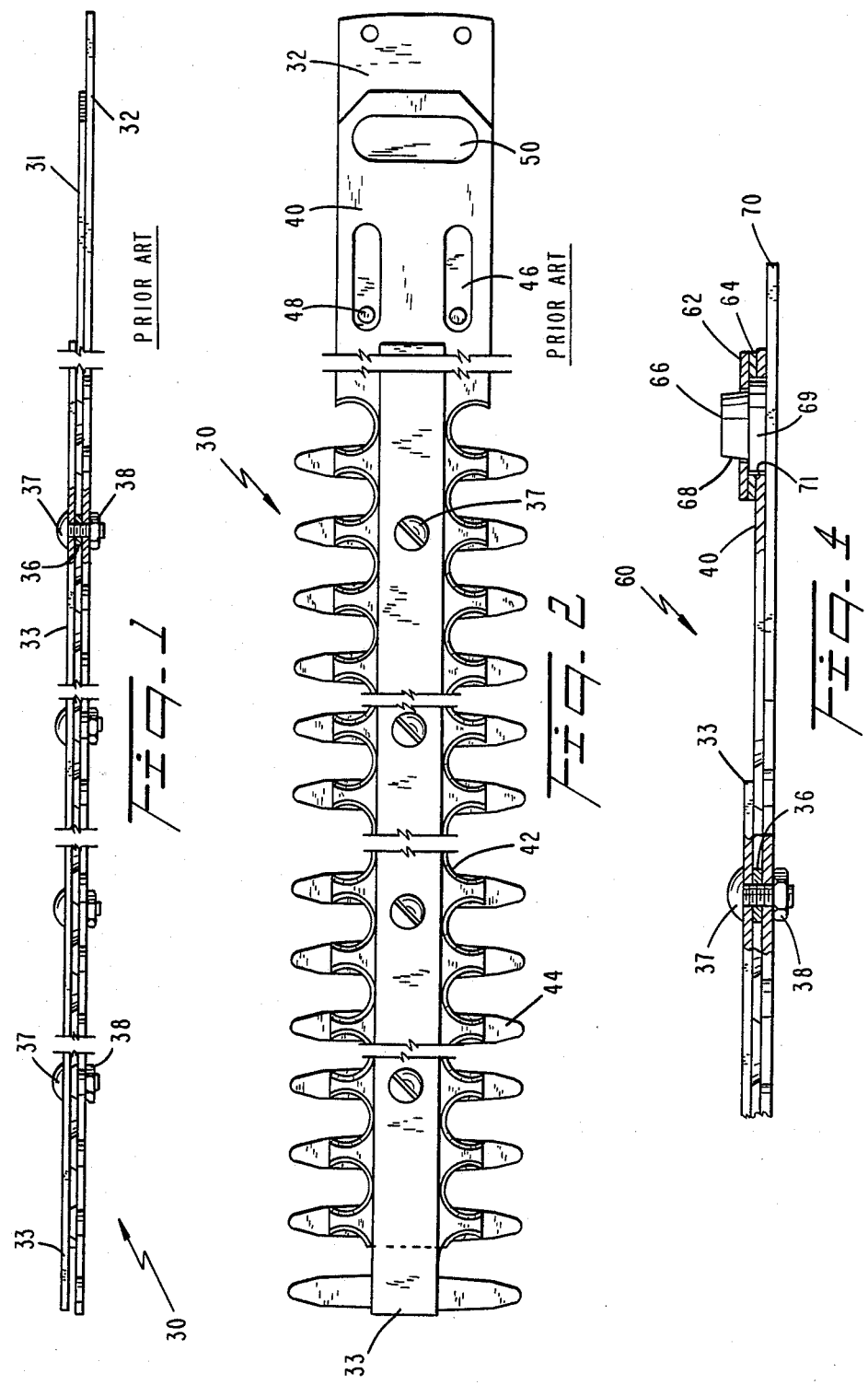

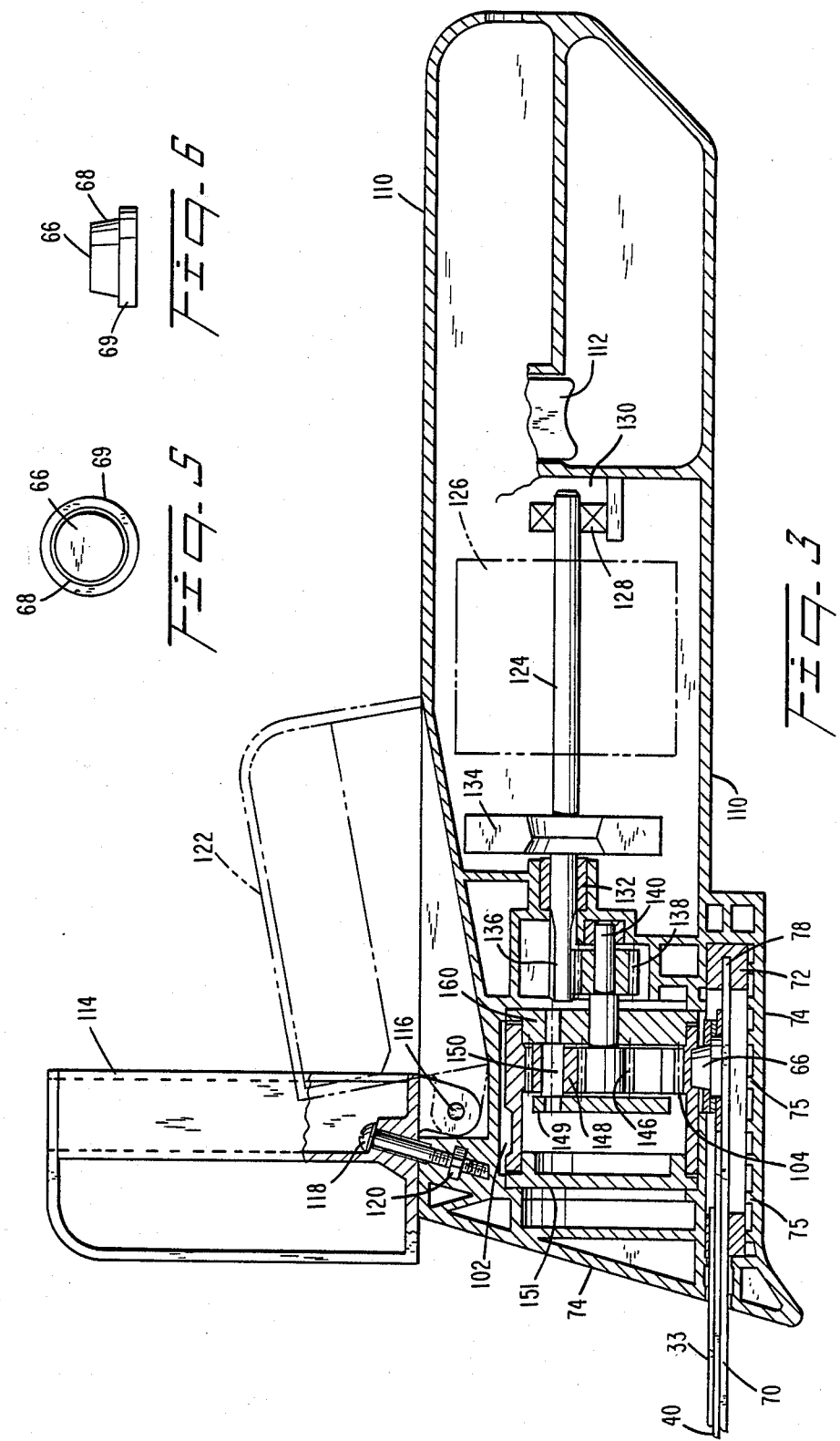

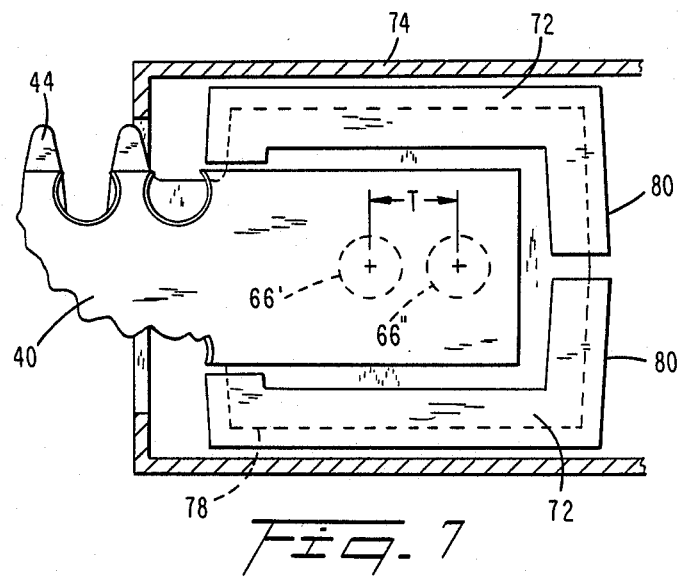
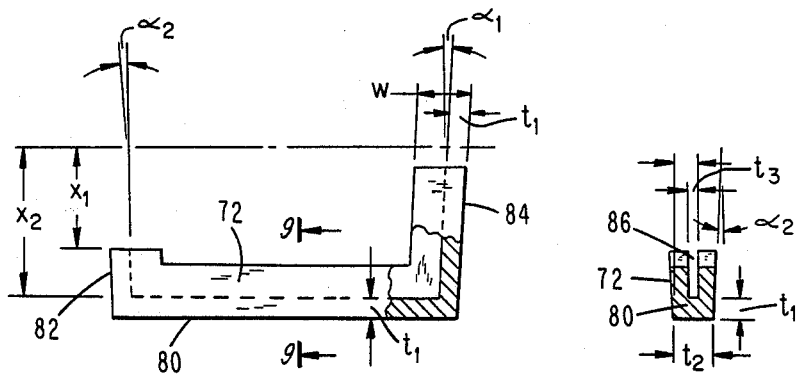
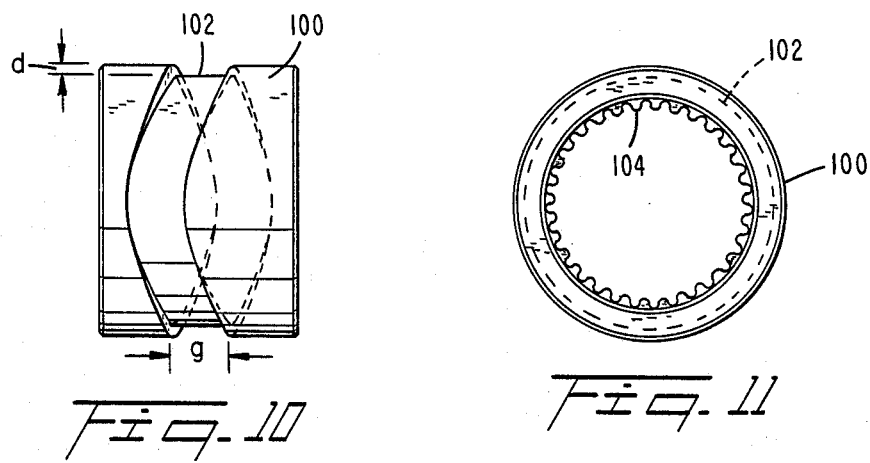

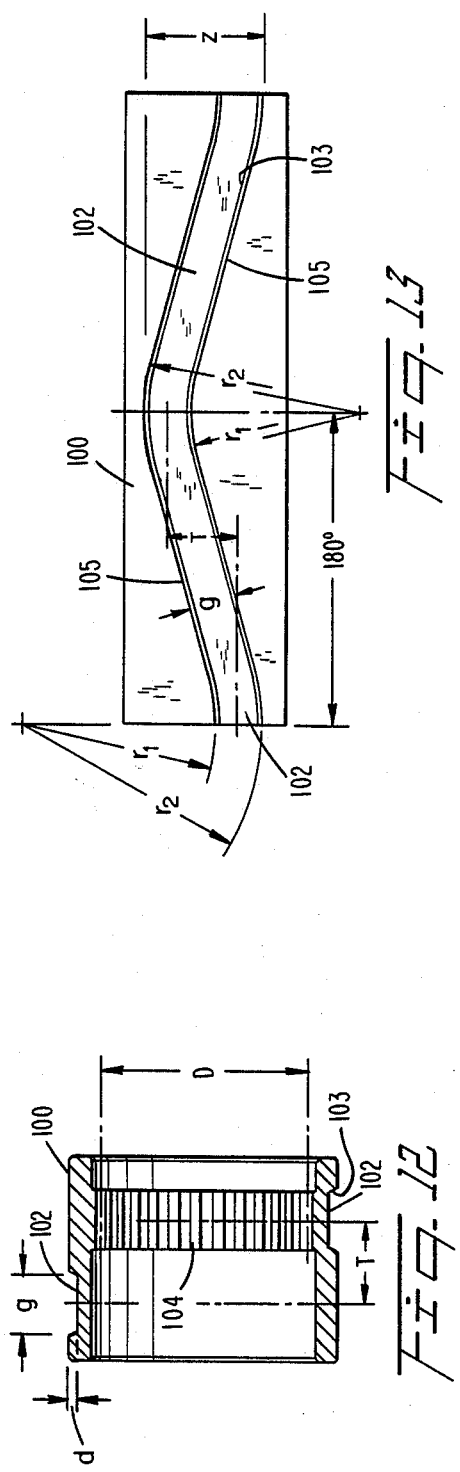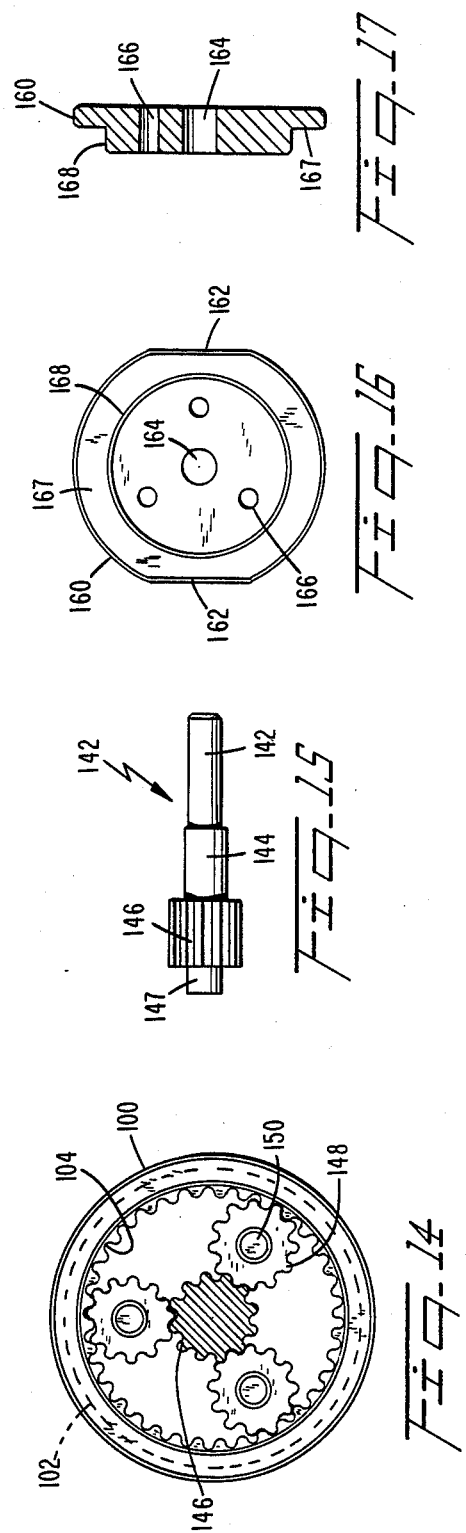

IN-LINE HEDGE TRIMMER WITH PLANETARY GEAR DRIVE AND VIBRATION DAMPING BLADE ASSEMBLY

TECHNICAL FIELD

This invention relates generally to power-driven, hand-held, hedge trimmers and, more particularly, to a low profile hedge trimmer with a cutting blade reciprocated parallel to an electric drive motor axis through a planetary gear drive and provided with damping means to reduce fatiguing vibration that would otherwise be transmitted from the trimmer blade to the user.

BACKGROUND OF THE INVENTION

Hand-held, power driven hedge trimmers having an extended cutting blade portion are well knowwn. Probably the commonest of these is the electrically powered hedge trimmer provided with an extension cord that is readily plugged into a household electrical socket. The basic structure of such device is designed to reduce the weight and provide a balanced and comfortable grip by a user operating the same to cut or sculpt bushes or hedgerows. Such cut material mostly comprises relatively soft stems, and, occasionally, woody stems that require a significant amount of force to sever them. Basically, therefore, hedge trimmers of the sort to which this invention relates are intended to be light, versatile pieces of hand-held equipment operable in a variety of orientations and capable of trimming vegetation without unduly tiring out a user.

The conversion of rotary motion into reciprocating motion, between cooperating cutting blades to cut grass, is long known, as exemplified in U.S. Pat. No. 51,746, to Palmer. This device has ground-contacting wheels of a lawnmower, each formed withan internal orbital gear of relatively large diameter in engagement through a double gear train to a crank mechanism for reciprocating cutting blades through a crank device. A somewhat comparable device is disclosed in Reissued U.S. Pat. No. 3394, to Crook, in which ground-engaging lawnmower wheels are formed to provide an internal orbit gear engaged through a gear train to generate speeded-up reciprocating motion through a crank to operate grass-cutting blades. In both examples, however, it is the outer orbital gear that is powered by motion of the entire device in contact with the ground, the gears are all essentially exposed to dirt and the elements, and the reciprocating motion is relatively speeded up as compared to the speed of rotation of the ground contacting wheels. Also, in both examples, reciprocating motion is generated by a rotary crank element.

U.S. Pat. No. 1,594,244, to Daniels, discloses a device in which the gears and crank mechanism are totally enclosed with lubricant to protect the same, while providing a reciprocating motion to cutting blades in a harvesting machine. In this device, a ring-type orbital gear engages a rotating planet gear rotatably carried on a crank driven by a power source. The rotating planetary wheel has attached to it a crank engaged to an element to be reciprocated. The device produces reciprocating motion because the gear wheel has an effective diameter exactly half that of the engaging orbital gear.

In U.S. Pat. No. 1,512,781, to Masland, a high-speed surgical saw is disclosed in which a rotary power input drive provided with a sinuous peripheral groove serves as a cam engaging a pin-like element attached to a reciprocating blade-holding element. The device of Masland is obviously intended to provide a short stroke, high-speed, reciprocating motion to a fine-toothed surgical sawblade and does not include any speed-reduction gearing. Obviously, such a device must be light and fairly small to afford the surgeon the necessary facility for cutting through a variety of tissues without exerting undue force.

U.S. Pat. No. 1,763,500, to Bowen, discloses an electrically powered sabre saw device in which an electrically powered motor provides a high-speed input, geared down through two pairs of spur gears to rotate a relatively solid drum provided with a fairly long travel groove on its outer periphery. This groove engages a pin-like portion of an element constrained to reciprocate back and forth with respect to the case while carrying at one end a straight, toothed sawblade. Unlike the device of Masland, the sabre saw of Bowen is designed to provide a relatively low-spped high force output, with a fairly long throw, so that the blade may cut through wood of some thickness. Also, presumably because wooden knots may be encounted for cutting, the grooved drum is solid and has a relatively high inertia to prevent stalling of the blade. In both Masland and Bowen, the groove and the pin engaged thereby are enclosed and may be lubricated in a manner that excludes extraneous dirt.

U.S. Pat. No. 2,633,636, to Szostek, discloses an electric hedge trimmer in which a rotary motor, through an enclosed set of five spur gear pairs, drives a solid rotating cylindrical element provided with two oppositely oriented continuous grooves to serve as cams. The grooves respectively engage a pin-like element of each of two adjacently placed reciprocating cutting elements formed with cutting teeth. This apparatus is provided with two side-by-side handles symmetrically disposed about the drive motor and provided with a flat guide element 11 parallel to the cutting teeth.

None of the devices described hereinabove, which are fairly typical of the prior art, combine speed reduction, light weight and durability and none provides insulation for the operator from inevitable and fatiguing vibration generated during operation of the device. There is, therefore, a definite need for a sturdy but light, hand-held, power driven hedge trimmer in which unpleasant feedback of vibrations to the user is minimized.

Hand-held, power-driven hedge trimmers of known type generally have a hand-held portion with handles and guard elements, containing a vertically oriented drive motor and/or gear and cam elements, and a forwardly extending cutting blade portion. the cutting blade portion includes a generally planar form that has a blade support element, a blade retaining element spaced therefrom, and a reciprocating cutting blade element contained and guided therebetween to coact with at least the support blade element to generate cutting action by reciprocatory motion relative thereto. These structures typically include a transverse elongated slot in a movable cutting blade element, for engaging a downwardly dependent pin powered by the drive motor to rotate in the plane of the cutting blade element.

Among the problems encountered in the hitherto described prior art device are the following: cutting with a vertically oriented drive motor and gearing causes the hand-held portion to be unwieldy; the coaction of the pin rotating around the vertical axis and engaging the reciprocating cutting blade element as well as cutting of though stems generates undesirable vibrations and causes fatigue to the user; and, over a period of time, there is unacceptably high wear in the elongate slot that engages the downwardly depending pin driving the same.

The present invention is intended to alleviate all of the problems discussed above.

SUMMARY OF THE INVENTIONS

Accordingly, it is an object of this invention to provide a hand-held, power driven hedge trimmer apparatus that is sturdy, light, easy to hold during operation and relatively free of vibrational feedback to the user.

It is a further object of this invention to provide light-weight, lubricant-sealed apparatus for converting a high-speed rotary input into a relatively low speed reciprocating output directed in line with the axis of the rotary input.

It is an even further related object of this invention to provide a light-weight device generating a reciprocatory motion in a direction parallel to the axis of the rotary input.

These and other objects of this invention are realized by providing a hand-held, power driven cutting device with a reciprocating blade driven from a rotary power input via a hollow cylindrical rotating drum containing speed reduction means and engaging a reciprocation generating means. In one aspect of the invention the hollow, cylindrical drum element is formed as a ring or orbit gear engaing through one or more planet gears a central coaxially rotating sun gear driven by a motor. In another aspect of the invention, the reciprocating motion is generated by engagement of a pin, carried by a reciprocating cutting blade, with a closed sinuous cam groove formed on the outer surface of the hollow cylindrical drum. In yet another aspect of the invention, resilient damping elements are force-fitted to an end of a blade support element and these elements are affixed in a hand-held portion of the device to isolate feedback of vibrational forces from the forwardly extending cutting end of the device to the user.

Still other objects and advantages of the present invention will become readily apparent to those skilled in this art from the following detailed description, wherein only the preferred embodiment of the invention is shown and described, simply by way of illustration of the best mode contemplated of carrying out the invention. As will be realized, the invention is capable of other and different embodiments, and its several details are capable of modifications in various obvious respects, all without departing from the invention. Accordingly, the drawing and descriptions are to be regarded only as illustrative in nature, and not as restrictive.

BRIEF DESCRIPTION OF THE DRAWINGS

FIG. 1 is a partial, longitudinal cross-sectional view of the cutting blade portion of a known hand-held hedge trimmer.

FIG. 2 is a plan view of the cutting blade portion of the known hedge trimmer according to FIG. 1.

FIG. 3 is a partial, vertical, longitudinal cross-sectional view of the hand-held end of a power driven hedge trimmer according to the present invention.

FIG. 4 is a partial, longitudinal cross-sectional view near the drive end of the cutting blade portion of the hand-held, power driven hedge trimmer according to a preferred embodiment of this invention.

FIGS. 5 and 6 are, respectively, plan and side elevation views of a driving pin for driving the reciprocatory cutting blade according to this invention.

FIG. 7 is a partial plan view illustrating the vibration damped mounting of the cutting blade portion of a power driven hedge trimmer according to the present invention.

FIG. 8 is a partially cut away plan view of one of the damping elements employed to mount the cutting blade portion of a power driven hedge trimmer according to the present invention.

FIG. 9 is a transverse view at section 9—9 of the damping mount according to FIG. 8.

FIG. 10 is a side elevation view of a rotating groove cam element that converts geared-down rotary motion to the reciprocating motion in the preferred embodiment of this invention.

FIG. 11 is an end view of the rotating cam element of FIG. 10.

FIG. 12 is a longitudinal cross-sectional view of the rotating cam element of FIGS. 10 and 11.

FIG. 13 is a rolled-open view illustrating a flat projection of the shape of the groove on the periphery of the rotating cam element of FIGS. 10–12.

FIG. 14 is a schematic depiction, in end elevation view, of a gear train contained within the rotating cam element of FIGS. 10–13.

FIG. 15 is a gear pin supporting a planetary gear in the gear train illustrated in FIG. 14.

FIGS. 16 and 17 are, respectively, end elevation and longitudinal cross-sectional views of a planetary gear support end plate for the gear train illustrated in FIG. 14.

DESCRIPTION OF THE PREFERRED EMBODIMENT

Referring now to FIGS. 1 and 2, there is shown a cutting blade portion 30 of a known powered hedge trimmer wherein a flat, elongate rigid blade support element 32 is affixable at one end (the right-hand end as seen in the figures) to the hand-held portion of the device. Attached thereto and spaced therefrom by washer-like elements 36 is an elongate cutting blade guide element 33 affixed to the blade support element by a plurality of screws 37 engaging nuts 38. Such an arrangement permits easy disassembly of cutting blade portion 30 for service, maintenance, and replacement of damaged elements. Blade support element 32 is formed along its longest edges to have a plurality of laterally extending teeth, and is preferably made of a relatively hard material such as steel.

At the end affixed to the hand-held portion, blade support element 32 is provided with a pair of pins 48 disposed to be slidingly engaged within elongate slots 46 formed in a movably cutting blade that reciprocates between blade support element 32 and blade guide element 33. Also, movable cutting element 31 is formed with central elongate slots (not shown) within which screws 37 are engaged in relative sliding motion during operation of the device. By this arrangement, the movable reciprocating cutting blade element 31 is guided to move slidingly between blade support element 32 and blade guide element 33. Lubricant may be provided to the relatively sliding surface. Cutting blade element 31 is provided with sharp arcuate cutting edge portions 42 that travel back and forth with respect to the teeth formed in blade support element 32 to exercise a scissors-like action to cut portions of vegetation caught between pairs of adjacent teeth 44. Movable blade element 31 is also provided with a transverse elongate slot 50 with rounded ends, for engaging therein a downwardly dependent rotating pin geared down to run at a relatively slow speed and powered by a rotary motor. The motor and gear elements are not shown for simplicity but, as persons skilled in the art will appreciate, a downwardly depending pin rotating in a circular motion will coact with elongate slot 50 to cause reciprocation of movable cutting blade element 31 as described hereinabove.

Referring now to FIG. 3, wherein is shown a hand-held portion of a powered hedge trimmer according to a preferred embodiment of the present invention, a light rigid handle 110 is formed so that the user may place his fingers through an end portion and his trigger finger can act on partially shown switch 112 to lift the same to actuate the device. The wiring for such hand-held tools is so commonplace that it is believed unnecessary to disclose the structure and details thereof. Persons skilled in the art are believed to be perfectly capable of determining the type of wiring necessary to cause switch 112 to power a drive motor when pressed.

An electric motor armature 126, indicated merely in broken lines because its details are not significant to the present invention, is located in the hand-held handle portion and has a central shaft 124 supported at a bearing 128 located in a recess 130 of the handle at one end and, preferably, a self-lubricated journal bearing 132 conveniently pressed into a forward recess provided therefor in the handle. Between the motor armature 126 and forward bearing 132 is conveniently provided a cooling fan element 134 having radially oriented vanes generating air flow, whenever the motor is in operation, to cool the armature windings. Such elements are commonly known for hand-held power driven apparatus.

Shaft 124 driven by motor armature 126 has a forward portion 136, of relatively small diameter, formed to have a commensurately small number of gear teeth that engage with a spur gear 138 supported on end portion 142 of a gear pin 140. As generally indicated in FIG. 3, the effective diameter of spur gear 138 is larger than the effective diameter of gear 136. There is, therefore, a reversal in the direction of rotation generated by the engagement of gears 136 and 138, and a speed reduction ratio is obtained which is directly proportional to their respective radii or diameters.

It should be noted at this stage that the actual direction of rotation of the motor and/or any of the gears, for present purposes, is of no consequence. Reciprocatory motion of the cutting blade involves only a forward and backward motion that is totally independent of the direction of rotation of the rotating elements.

As best seen in FIG. 15, gear pin 140 has a centrally located portion supported in gear support plate 160 (to be described in greater detail hereinafter) and extends forwardly thereof to support a sun gear 146 rotatably with gear pin 140 and gear 138, and has a relatively small diameter portion 147 at its front end, the same being rotatably supported in the center of a support plate 149, best seen in FIG. 3.

In the gear train, as described hitherto, a relatively fast rotating shaft 124 thus rotates an input spur gear 136, through a larger spur gear 138, gear pin 140 and a sun gear 146. Referring now to FIG. 14, sun gear 146 engages a plurality of symmetrically distributed planetary gear wheels 148, which simultaneously engage a set of gear teeth forming an internal ring or orbit gear 104 inside a hollow, open-ended, cylindrical rotating drum element 100. As a consequence, when sun gear 146 rotates about a central axis, and planetary gears 148 rotate about spindles 150 on stationary axes preferably symmetrically disposed about the axis of sun gear 146, rotating drum element 100 rotates at a relatively reduced speed coaxially with sun gear 146 while containing both the sun gear 146 and all the planetary gears 148.

Planetary gears 148, as best understood with reference to FIG. 3, rotate about stationary spindles 150 supported at their ends in gear support plates 160 and 149. Persons skilled in the art will appreciate that these gear support plates 160 and 149 may conveniently be made of self-lubricating materials such as grease impregnated sintered metal. Other materials for this purpose are available and would be considered by a designer of such apparatus.

Referring now to FIGS. 16 and 17, it will be seen that gear support plate 160 has an outer periphery provided with two symmetrically disposed flats 162 which engage matchingly shaped portions (not shown) of the hand-held casing, so that rear gear support plate 160 cannot rotate in place. Cylindrical portion 168 of gear support plate 160 is sized to fit into and rotatably support the rear end of rotating drum element 100. A flat annular surface 167 of gear support plate 160 provides a thrust surface for the flat annular end surface of rotatable drum element 100. The front end of rotatably drum element 100, as best seen with reference to FIG. 3, is rotatably supported by a somewhat similarly shaped front support plate 151 also nonrotatably held, in the same manner as support plate 160, within the casing of the device. The front support plate 151 may be made of self-lubricating material and/or, as appropriate, lubricants such as a grease may be filled into the space surrounding the gears of the gear train as hitherto described.

Reviewing briefly, high speed rotary input from the drive motor goes through a first speed reduction by engagement of spur gears 136 and 138, and then through a further speed reduction through coaction of gear 146, planetary gears 148 and orbit gear 104, whereby rotating drum element 100 rotates at a relatively slow speed and a commensurately higher torque output to provide the desired reciprocating motion of a cutting blade element 40.

Referring now to FIGS. 10–13, it is seen how the outer peripheral cylindrical surface of rotating drum element 100 is provided with a continuous sinuous groove 102 having a constant width and a wavelike form in flat projection. As best seen in FIG. 12, groove 102 has a width "g" and a depth "d" and an overall lateral amplitude "T" that translates into reciprocating travel of cutting blade element 40.

The lateral surfaces 103 defining the sides of groove 102 (as indicated in FIG. 13), need not be normal to the axis of symmetry of rotating element 100. In other words, surfaces 103 may be inclined towards each other in the radially inward direction if desired. It is important that groove 102 have a generally smooth curvature and symmetrical disposition round the periphery of rotating element 100, but the exact shape thereof in flat projection is not critical. As illustrated in FIG. 13, a convenient shape for flat projection of groove 102 may be as indicated, i.e., with portions having effective inner and outer radii of curvature "$r_1$" and "$r_2$" connected by contiguous, blended, substantially straight portions 105.

A true sine curve should be equally acceptable. Considerations of manufacturing convenience, cost and the like are the principal determinants of such details.

Referring now to FIG. 4, it will be seen that cutting blade portion 60 according to the present invention includes a cutting blade support element 70, spacing washers 36, a cutting blade guiding and retaining element 33, retaining screws 37 and nuts 38, and reciprocating cutting blade element 40. Basically, the elongate portion of cutting blade support element 70 is formed into teeth 44 like those of its prior art counterpart 32 as discussed with reference to FIG. 2. For reasons explained more fully hereinbelow, the affixed end portion 78 of cutting blade support element 70 is shaped in a particular manner for holding thereof to dampen vibrations, and the drive-engaging end of movable cutting blade element 40 is shaped differently from its counterpart 31 as known in the prior art. Specifically, cutting blade element 40 is formed to have an aperture 71 very slightly larger than the larger diameter portion 69 of engaging pin 66, best seen in FIGS. 5 and 6. The thickness of cutting blade element 40 may be less than height "h$_2$" of the larger diameter portion 69 of pin 66. Pin 66 also has a preferably slightly tapered extending portion 68. A flat washer-like element 62 having an annular form, with an internal diameter slightly larger than the largest diameter of portion 68 of pin 66 and an outer diameter larger than the diameter of portion 69 of pin 66, is used to locate pin 66 with respect to moving cutting blade element 40. In fact, as a practical matter, this washer-like element 62 may be welded, brazed or otherwise permanently affixed to moving cutting blade element 40 and spaced therefrom by attaching portion 64 (made, for example, of weld metal) in such a manner that pin 66 is free to rotate and shift very slightly laterally when placed in conjunction with cutting blade element 40 without an interference fit.

When pin 66 is engaged with moving blade element 40, with the extended portion 69 projecting into groove 102 for sliding engagement therewith, the geared-down rotating motion of rotating element 100 is transmitted to pin 66 from groove 102 to cause the former to reciprocate forward and back between blade support element 32 and blade guiding element 33 parallel to the axis of motor armature 126. Persons skilled in the art will appreciate that if portion 68 of pin 66 and the sides of groove 102 are tapered, the respective slight tapers should be matched, i.e., their taper angles should be very similar for smooth and long-lived operation of the device. The period for one complete forward and back motion of moving blade element 40 moved by pin 66 attached thereto will be exactly the same as the period required for one complete rotation of rotating element 100 if the groove is formed as a single continuous waveform. Therefore, when the device is plugged into a source of electrical power, actuation of switch 112 by the user will generate a back-and-forth reciprocating motion of cutting blade element 40, which coacts with the teeth in cutting blade support element 70 to effect a scissors-like cutting action on any vegetation engaged by the forward portion of the device.

The throw "T", i.e., the magnitude of the reciprocating motion of reciprocating cutting blade element 31, is determined by the shape of groove 102 (as best seen with reference to FIG. 13) and is fully accommodated within the vibration damping and isolating structure described hereinbelow with reference to FIG. 7.

For the convenience of the user, a generally upwardly directed second handle portion 114 is pinned at pin 116 to primarily hand-held portion 110, as best seen in FIG. 3. For compactness in packaging the device for transporting to points of sale, secondary hand-held portion 114 may be rotated about pin 116 to the position indicated by broken lines at 122. However, upon extraction of the device from its packaging, the user will rotate secondary portion 114 to its upright position and fix the same in place with screw 118 engaging nut 120. A user of the device, therefore, would hold portion 110 with one hand, with the forefinger of that hand in place to press on switch 112, and hold the secondary handle portion 114 with his or her other hand to manipulate the device during use.

It should be appreciated that the structure selected and described herein provides reciprocation of the cutting blade element 40 in a direction parallel to the axis of motor armature 126 driving the same. This in-line configuration ensures a low profile device that is highly efficient and very convenient to use for prolonged periods.

As will be understood by persons reasonably skilled in the art, the cutting action as described hitherto, in practice, requires the application of a forwardly or backwardly directed force to moving cutting blade element 40 with respect to its supporting element 70 large enough to cut a resisting piece of vegetation therebetween. Thus, even if the electrical motor powering the device rotates at, for example, 3000 rpm, selection of proper ratios between gears 136 and 138, as well as between gears 146 and 104, will readily generate a slower powerful reciprocating stroke of cutting blade element 40. However, if a woody twig is caught by moving blade element 40 and is cut thereby, the sudden resistance when the twig is cut will generate an inertial force principally in the direction of motion of the reciprocating cutting blade element 40. Thus, when the user is applying the device to a well-established or long-neglected hedge, he or she will feel a fairly strong related vibratory feedback in the cutting blade and, over time, will experience significant fatigue. This is independent of any vibration generated by the rotating and reciprocating elements of the operating device even when no actual cutting is being effected, e.g., as the user moves around from place to place along a hedge.

One solution is to provide mechanical damping between the back end of cutting blade support element 70 and the hand-held portion of the device to which it is attached. Such damping is provided in a preferred embodiment of this invention, as best seen in FIGS. 3 and 7, by the intromission of a pair of resilient mounting elements 80 fitted symmetrically about the line of motion of reciprocating cutting blade element 40 at an end portion 78 thereof. The casing 74 of the hand-held portion of the device is formed at a lower portion thereof with transverse ribs 75 that contact a lower surface of damping elements 80 pressed into position to hold end portion 78 of the blade support element 70. Contact between the resilient material of damping elements 80 and the casing 74 of the hand-held portion of the device is therefore limited principally to contact between the tops of rigs 75 and the immediately contacting portions of the resilient material. It should be noted, as mentioned earlier, that the throw "T" of the reciprocating cutting blade element 31, between extreme positions 66', 66" of pin 66, is fully accommodated within the span of damping elements 80.

As best seen with reference to FIGS. 7, 8 and 9, each damping element 80 has a generally C-shaped when seen in plan view, and a generally U-shape when seen in transverse cross-section. Each damping element 80 also has a long flat face 72 on its upper and lower sides, having the general shape of a C. Each of the sides constituting the C, e.g., 82, 72 and 84, has a generally U-shaped cross-section, the interior 86 of which has a width "$t_3$" slightly less than the thickness of portion 78 of blade supporting element 70 so that, when damping elements 80 are forcibly pressed into place, each damping element 80 will firmly grip the blade supporting element end.

Various lateral dimensions "$x_1$," "$x_2$", "w" and thicknesses "$t_1$" through "$t_3$" are indicated in FIGS. 8 and 9 and these will be determined by the actual physical size selected for the device, the resilient material chosen for the damping elements and the amount of damping desired. As indicated in FIGS. 8 and 9, the end portions of the generally C-shape of the damping element as well as the transverse shape thereof need not necessarily involve only right angles. Considerations of ease of manufacture and replacement would guide persons skilled in the art in selecting such geometrical parameters of the damping elements. Angles such as "$\alpha_1$" and "$\alpha_2$" are in the range of 2 to 5 degrees.

Basically, therefore, according to the present invention, suitably shaped and sized damping elements 80 are pressed-fitted to cutting blade support element 70 at end portion 78 thereof and the thus assembled end is firmly pressed into place into casing 74 over ribs 75 and retained therein to effectively provide isolation of undesirable vibrational forces that would otherwise be transmitted from the cutting blade elements to the hand-held portion of the trimmer and thus to the user.

In summary, as will be understood by persons skilled in the art, what is disclosed herein is a power-driven, reciprocating-bladed hedge trimmer that is light (since the principal rotating and reciprocation-generating rotating drum element 100 is hollow), durable (because the entire gear train can be enclosed with lubicant), easy to hold (by conjunction of hand-held handle portions 110 and 114), and highly convenient for prolonged use (with undesirable vibrations attenuated or isolated by coaction of resilient damping elements 80 and rib portions 75 of the casing contacting the same).

Persons skilled in the relevant art will also immediately appreciate that the teaching of this invention extends generally to other variations on the same theme, i.e., devices such as electrically powered meat cutters, hair trimmers and the like, in which it is highly desirable to have reciprocatory motion without undue weight and with the vibrations damped out. Likewise, as such persons will appreciate, the gear train structure disclosed herein can be further modified for particular uses, e.g., groove 102 may be formed to present two or more complete wavelengths around the periphery of rotating drum element 100 is a higher output speed is desired, as more grooves may be provided with selected relative juxtapositioning. Similarly, instead of ribbing 75 being provided in the casing of the hand-held portion of the device, various forms of ribbing may be molded into the resilient material of the damping elements 80 to achieve similar results. Assorted combinations of the various features disclosed herein may be combined to produce a variety of advantageous results, and it is expected that this invention will have wide utility.

In this disclosure, there are shown and described only the preferred embodiments of the present invention, but, as aforementioned, it is to be understood that the invention is capable of use in various other combinations and environments and is capable of changes or modifications within the scope of the inventive concept as expressed herein.

What is claimed is:

1. A hand-held, power-driven, reciprocating blade type cutting device, comprising:
    means for providing rotary driving power input at a first rotatable shaft aligned parallel with a direction along which the blade reciprocates;
    speed reduction means contained within a rotatable hollow cylindrical drum element coaxial with said first shaft for receiving said power input from said first shaft and delivering a relatively lower speed rotary power output rotating said hollow cylindrical drum element; and
    reciprocation generating means for converting said rotary power output of said hollow cylindrical drum element to a translational output to drive the blade;
    said reciprocation generating means comprising a continuous, generally sinusoidal, closed path groove formed in an outer cylindrical surface of said hollow cylindrical drum element and an engagement member attached to an end of the blade to be in relatively sliding engagement with said closed path groove, whereby rotation of said hollow cylindrical drum element forcibly moves the blade into said reciprocatory motion thereof.

2. The cutting device according to claim 1, wherein:
    said speed reduction means comprises a sun gear rotated by said first shaft within said hollow cylindrical drum element, at least one planet gear rotatable about a fixed shaft and in rotary engagement with the sun gear, an inside portion of the hollow cylindrical drum element being formed as a peripheral orbit gear in rotary engagement with said at least one planet gear, whereby the driving power input to said first rotatable shaft is converted into said relatively lower speed output rotating said hollow cylindrical drum element.

3. The cutting device according to claim 2, wherein:
    said hollow cylindrical drum element is sealed at both ends to retain gear lubricant and to exclude extraneous dirt from the gearing contained within.

4. The cutting device according to claim 2, wherein:
    a plurality of said planet gears are provided on corresponding fixed shafts disposed symmetrically about said first rotatable shaft.

5. The cutting device according to claim 2, wherein:
    said power input means comprises an electrically driven motor and an intermediate gear drive engaging the same to drive said first rotatable shaft.

6. The cutting device according to claim 3, wherein:
    a plurality of said planet gears are provided on corresponding fixed shafts disposed symmetrically about said first rotatable shaft.

7. The cutting device according to claim 6, wherein:
    said power input means comprises an electrically driven motor and an intermediate gear drive engaging the same to drive said first rotatable shaft.

8. The cutting device according to claim 1, further comprising:
    blade guiding means providing two parallel guiding surfaces for locating and partially containing the blade to slidingly guide the same, a first one of said guiding surfaces being provided by a blade support member attached at one end to a hand-held portion of the cutting device; and vibration damping means at said attached end of said blade support member for damping vibrational forces generated by said blade reciprocation and transmitted through said blade support member to the hand-held portion of the device.

9. The cutting device according to claim 8, wherein: said speed reduction means comprising a sun gear rotated by said first shaft within said hollow cylindrical drum element, at least one planet gear rotatable about a fixed shaft and in rotary engagement with the sun gear, an inside portion of the hollow cylindrical drum element being formed as a peripheral orbit gear in rotary engagement with said at least one planet gear, whereby the driving power input to said first rotatable shaft is converted into said relatively lower speed output rotating said hollow cylindrical drum.

10. The cutting device according to claim 9, wherein: said cutting device is a hedge trimmer that comprises electrical connection means for connecting the power input means to a source of electrical power.

11. The cutting device according to claim 8, wherein: said vibration damping means comprises at least one resilient element intermediate said attached end of said blade support member and said hand-held portion of the cutting device.

12. The cutting device according to claim 11, wherein: said hand-held portion of the cutting device is formed with local ribbing having end portions contacting said at least one resilient element.

13. The cutting device according to claim 12, wherein: said at least one resilient element has the general form of a "C" with two short arms connected by a relatively long arm and all three arms are formed to have a contiguous groove at an inside portion of the generally "C" shape, said groove being formed in shape and size such as to enable a force fit of said at least one resilient element along an edge of said blade support member.

14. The cutting device according to claim 11, wherein: said at least one resilient member is formed of a rubber material.

15. The cutting device according to claim 10, wherein: said vibration damping means comprises at least one resilient element intermediate said attached end of said blade support member and said hand-held portion of the cutting device; and said at least one resilient element has the general form of a "C" with two short arms connected by a relatively long arm and all three arms are formed to have a contiguous groove at an inside portion of the generally "C" shape, said groove being formed in shape and size such as to enable a force fit of said at least one resilient element along an edge of said blade support member.

* * * * *